United States Patent
Thramann

(10) Patent No.: US 9,024,462 B2
(45) Date of Patent: May 5, 2015

(54) GENERATION OF ELECTRICAL ENERGY IN A SKI OR SNOWBOARD

(71) Applicant: Jeff Thramann, Longmont, CO (US)

(72) Inventor: Jeff Thramann, Longmont, CO (US)

( * ) Notice: Subject to any disclaimer, the term of this patent is extended or adjusted under 35 U.S.C. 154(b) by 26 days.

(21) Appl. No.: 14/031,934

(22) Filed: Sep. 19, 2013

(65) Prior Publication Data

US 2014/0077656 A1 Mar. 20, 2014

Related U.S. Application Data

(60) Provisional application No. 61/702,859, filed on Sep. 19, 2012.

(51) Int. Cl.
| | |
|---|---|
| *F03B 13/00* | (2006.01) |
| *H02P 9/04* | (2006.01) |
| *H02N 11/00* | (2006.01) |
| *A63C 5/07* | (2006.01) |

(52) U.S. Cl.
CPC ........... *H02N 11/002* (2013.01); *H02N 11/008* (2013.01)

(58) Field of Classification Search
USPC .............................. 290/1 R, 54; 280/602, 612
See application file for complete search history.

(56) References Cited

U.S. PATENT DOCUMENTS

| | | | | |
|---|---|---|---|---|
| 3,505,878 | A * | 4/1970 | Moll ................................ | 73/490 |
| 3,762,735 | A * | 10/1973 | Smolka .......................... | 280/612 |
| 4,402,524 | A | 9/1983 | D'Antonio et al. ............ | 280/612 |
| 4,697,360 | A | 10/1987 | Sartor .............................. | 36/2.6 |
| 4,782,602 | A | 11/1988 | Lakic ............................... | 36/2.6 |
| 4,837,494 | A | 6/1989 | Maier ............................... | 322/1 |
| 4,864,860 | A | 9/1989 | Manseth ......................... | 73/490 |
| 5,098,426 | A | 3/1992 | Sklar et al. ......................... | 606/5 |
| 5,441,305 | A * | 8/1995 | Tabar ............................ | 280/809 |
| 5,499,836 | A * | 3/1996 | Juhasz ........................... | 280/602 |
| 5,590,908 | A * | 1/1997 | Carr .............................. | 280/809 |
| 5,615,905 | A * | 4/1997 | Stepanek et al. .............. | 280/602 |
| 5,621,264 | A | 4/1997 | Epstein et al. ................ | 310/339 |
| 5,645,260 | A * | 7/1997 | Falangas ....................... | 248/550 |

(Continued)

FOREIGN PATENT DOCUMENTS

| | | |
|---|---|---|
| EP | 0207302 A2 | 1/1987 |
| FR | 2604367 A1 | 4/1988 |

OTHER PUBLICATIONS

Boudway, I. "Tom Krupenkin's Power Shoes" Bloomberg BusinessWeek Magazine. Dec. 1, 2011; Retrieved from <http://www.businessweek.com/magazine/tom-krupenkins-power-shoes-12012011.html> on Dec. 12, 2013. 2 pages.

(Continued)

*Primary Examiner* — Pedro J Cuevas
(74) *Attorney, Agent, or Firm* — Perkins Coie LLP

(57) ABSTRACT

A ski or snowboard having an interface power source is provided. The power source uses reverse electrowetting technology to generate a charge to power devices connected to the interface. The power source includes a flexible, non-conductive substrate having a first side and a second side opposite the first side with a channel between the first and second sides. Electrodes are arranged about the channel in a predefined pattern. A liquid is contained in the channel. The liquid includes a dielectric liquid and a conductive liquid that do not mix. The electric change is generated by moving the liquid back and forth across the electrodes. The force to pump or move the liquid is provided by motion of the ski or snowboard.

17 Claims, 4 Drawing Sheets

(56) References Cited

U.S. PATENT DOCUMENTS

| | | | |
|---|---|---|---|
| 5,656,882 A * | 8/1997 | Lazarus et al. | 310/328 |
| 5,674,135 A * | 10/1997 | Franco et al. | 473/318 |
| 5,775,715 A * | 7/1998 | Vandergrift | 280/602 |
| 5,775,716 A * | 7/1998 | Harsanyi et al. | 280/602 |
| 5,857,694 A * | 1/1999 | Lazarus et al. | 280/602 |
| 6,007,086 A * | 12/1999 | Hopkins | 280/612 |
| D423,618 S * | 4/2000 | Kincaid et al. | D21/766 |
| 6,102,426 A | 8/2000 | Lazarus et al. | 280/602 |
| 6,285,902 B1 | 9/2001 | Kienzle, III et al. | 600/427 |
| 6,345,834 B1 | 2/2002 | Bianchini et al. | 280/602 |
| 6,431,733 B2 * | 8/2002 | Seifert et al. | 362/459 |
| 6,614,453 B1 | 9/2003 | Suri et al. | 715/764 |
| 6,675,040 B1 | 1/2004 | Cosman | 600/427 |
| 6,782,287 B2 | 8/2004 | Grzeszczuk et al. | 600/424 |
| 6,861,782 B2 * | 3/2005 | Lammer | 310/317 |
| 7,080,849 B2 * | 7/2006 | Lammer | 280/602 |
| 7,098,578 B2 * | 8/2006 | Lammer | 310/338 |
| 7,327,046 B2 * | 2/2008 | Biamonte | 290/1 R |
| 7,898,096 B1 | 3/2011 | Krupenkin | 290/1 R |
| 7,935,437 B2 | 5/2011 | Hodes et al. | 429/112 |
| 7,978,400 B2 | 7/2011 | Takemoto et al. | 359/316 |
| 8,083,238 B2 * | 12/2011 | Borges | 280/11.203 |
| 8,414,167 B2 * | 4/2013 | Borges | 362/486 |
| 2005/0203384 A1 | 9/2005 | Sati et al. | 600/426 |
| 2008/0269596 A1 | 10/2008 | Revie et al. | 600/424 |
| 2009/0088634 A1 | 4/2009 | Zhao et al. | 600/427 |
| 2009/0088773 A1 | 4/2009 | Zhao et al. | 606/130 |
| 2010/0206863 A1 | 8/2010 | Ritter | 219/202 |
| 2010/0256504 A1 | 10/2010 | Moreau-Gaudry et al. | 600/476 |
| 2011/0015521 A1 | 1/2011 | Faul | 600/426 |
| 2014/0049049 A1 * | 2/2014 | Krupenkin et al. | 290/1 A |

OTHER PUBLICATIONS

Krupenkin, T. and Taylor, A. "Reverse electrowetting as a new approach to high-power energy harvesting." Nature Communications 2:448. Published Aug. 23, 2011. 7 pages.

International Search Report and Written Opinion of the International Searching Authoriy for PCT/US2013/060714, mailed Jan. 7, 2014. 12 pages.

* cited by examiner

GENERATION OF ELECTRICAL ENERGY IN A SKI OR SNOWBOARD

CLAIM OF PRIORITY UNDER 35 U.S.C. §119

The present application claims priority to U.S. Provisional Patent Application Ser. No. 61/702,859, filed Sep. 19, 2012.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to generating electrical energy, and more specifically, to using the movement and bending of a ski or snowboard as a pump in a microfluidic device to generate electrical energy.

2. Background

Skiing and snowboarding are common outdoor activities during the winter. Both activities are typically undertaken during chilly and cold weather resulting in uncomfortable conditions, especially in the extremities. Heaters in boots, gloves, head gear, and clothing have been attempted to combat the temperature, which would generally result in a more pleasurable experience.

Portable electronics are essentially ubiquitous in today's world. Many people that ski and snowboard use mobile computing devices, such as, smartphones, MPG players, cellular phones, handheld computers, and the like while in the outdoors. These devices use electrical power and may use a significant portion of the available battery charge during extensive use in the outdoors.

Historically, devices have been added to skis and snowboards to generate electrical energy. For example, in U.S. Pat. No. 4,864,860, which issued to Manseth on Sep. 12, 1989, and is titled Electrical Apparatus for a Ski. Another exemplary system is disclosed in U.S. Pat. No. 4,837,494, which issued to Maier on Jun. 6, 1989, and is titled Generator and Rechargeable Battery System for Ski. Both patents, the disclosures of which are incorporated herein as if set out in full, provide a generator assembly mounted on the ski. The generator assembly includes a rotor that extends from the ski and is rotated by frictional contact with the ground. The mounted generator assemblies, however, have numerous drawbacks. One exemplary drawback includes the fact that the additional parts are prone to breakage and the like.

Thus, against the above background improved systems and methods to generate electricity in a ski or snowboard is needed.

SUMMARY

Embodiments disclosed herein address the above stated needs by providing an implantable device with an implantable power supply. The implantable power supply converting mechanical energy of the body, such as the expansion and contraction of muscles into electrical energy using microfluidics or mechanical strain.

DETAILED DESCRIPTION

The technology of the present patent application will now be explained with reference to various figures, tables, and the like. While the technology of the present application is described with respect to certain snow skis and snowboards, one of ordinary skill in the art would now recognize that the technology is applicable to other devices that would provide a similar type of action, such as, for example, skateboards, snow skates, snowmobiles, waterskis, surf boards, and the like. Moreover, the technology of the present patent application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Additionally, in certain instances, only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art. Moreover, the connections may be wired or wireless, private or public networks, or the like.

Figure 1:
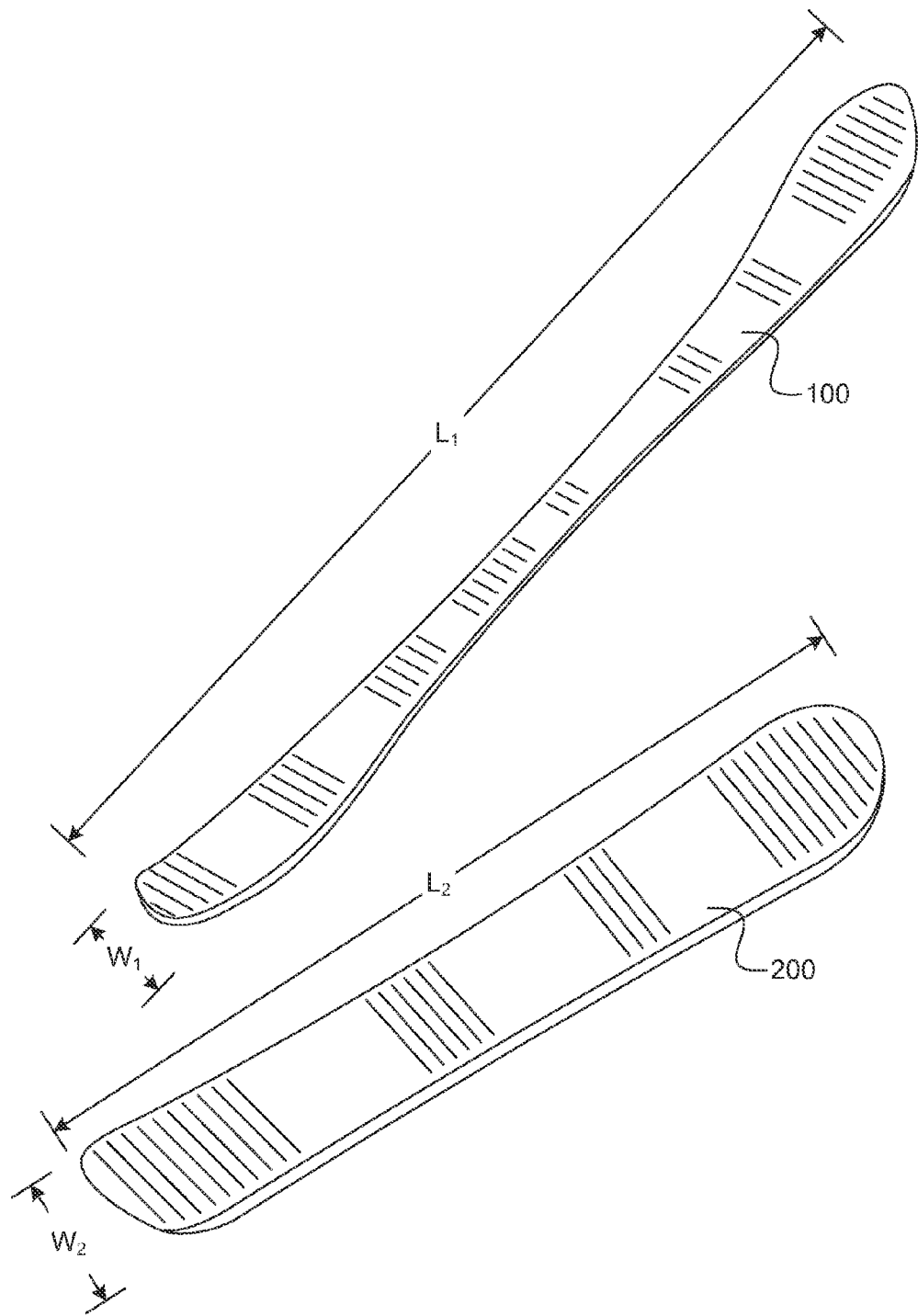
FIG. 1 is a perspective view of a ski and a snowboard consistent with the technology of the present application.
Figure 2:
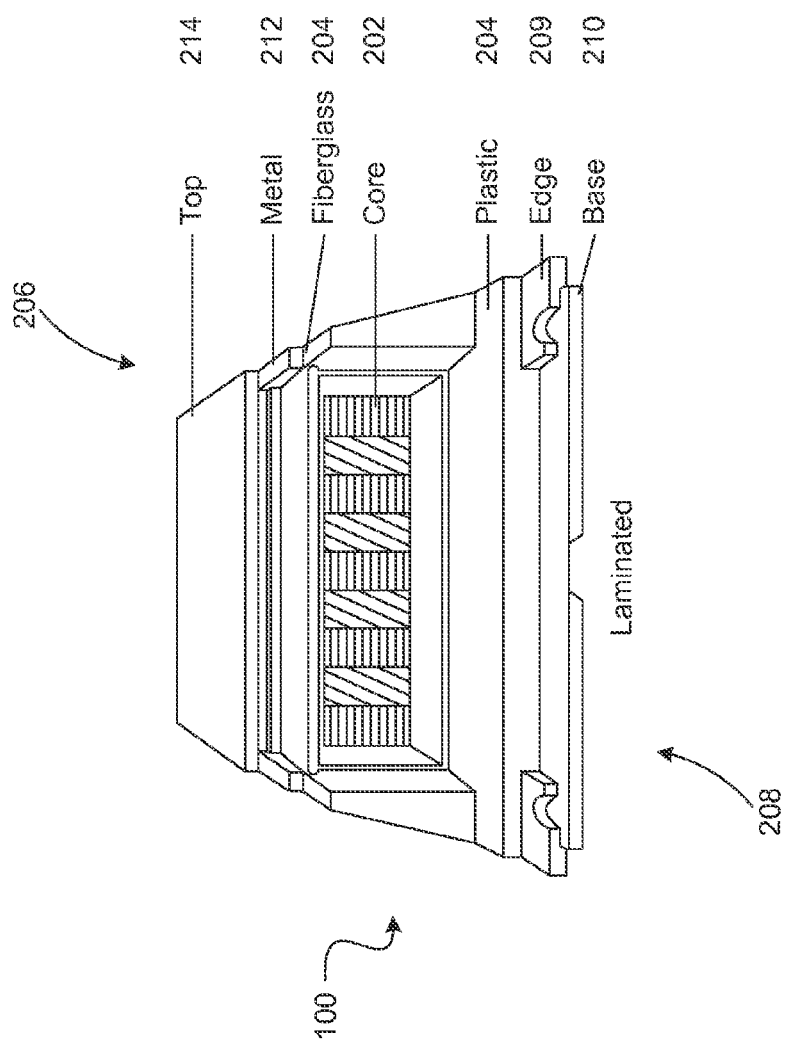
FIG. 2 is a cut away view of the exemplary ski of FIG. 1 showing an exemplary construction.

Referring first to FIG. 1, a ski 100 and a snowboard 200 are shown. Conventionally, the ski 100 and snowboard 200 may be formed from a number of different materials. Some exemplary materials include, for example, woods, wood laminates, metal laminates, fiberglass laminates, and the like. With reference to FIG. 2, a cut away view of the ski 100 is provided that shows an exemplary construction of the ski 100 formed using a laminated process, although other processes, layers, and the like are possible. The construction shown in FIG. 2 is provided for completeness. As shown, the ski 100 is formed with a core 202. The core 202 is sandwiched by composites 204 on the top 206 (or binding side) and the bottom 208 (or snow side). The composites 204 may include, for example, fiberglass, plastics, or the like. Typically, metal edges 209 are provided about the perimeter of the ski 100 between the composite 204 on the bottom 208 and the base 210. The base 210 is composite material such as, for example, polyethylene that may be sintered. The edges may be steel or the like. The top side of the ski may include a metal edge 212 and a composite top layer 214, such as, for example, fiberglass. Once the layers are assembled, the ski is cured and bonded in a mold. Snowboard 200 is formed in a similar construction.

Figure 3:
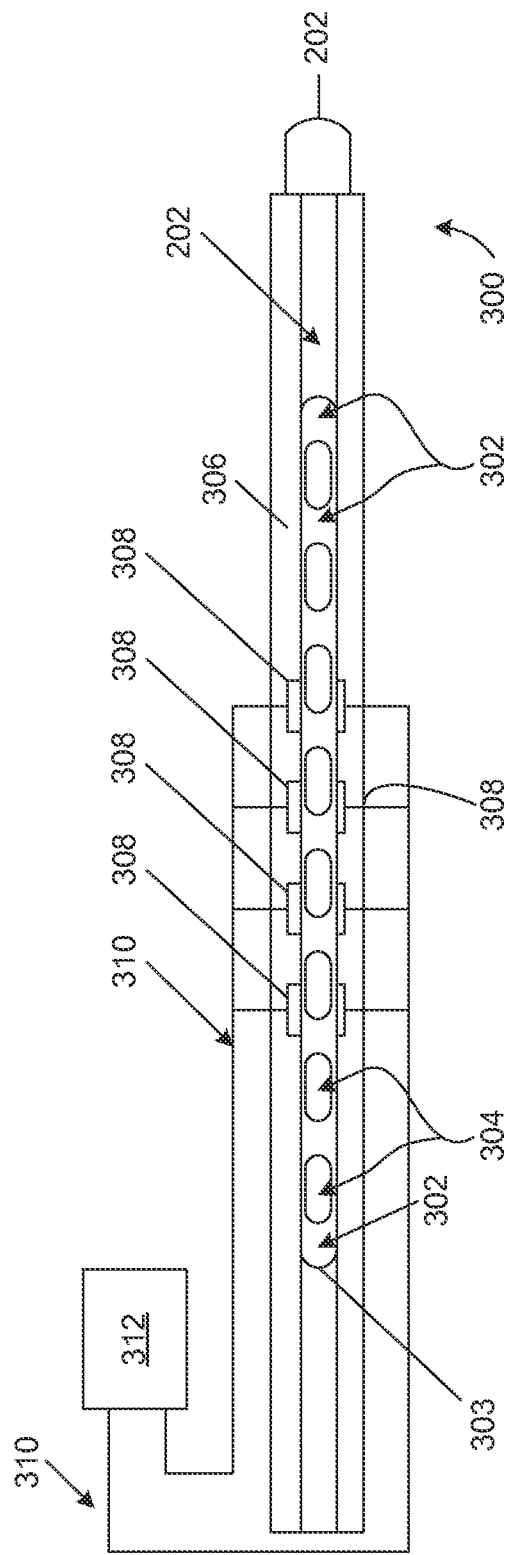
FIG. 3 is a cross sectional view from the side of the core of the exemplary ski of FIG. 1 consistent with the technology of the present application.
Figure 4:
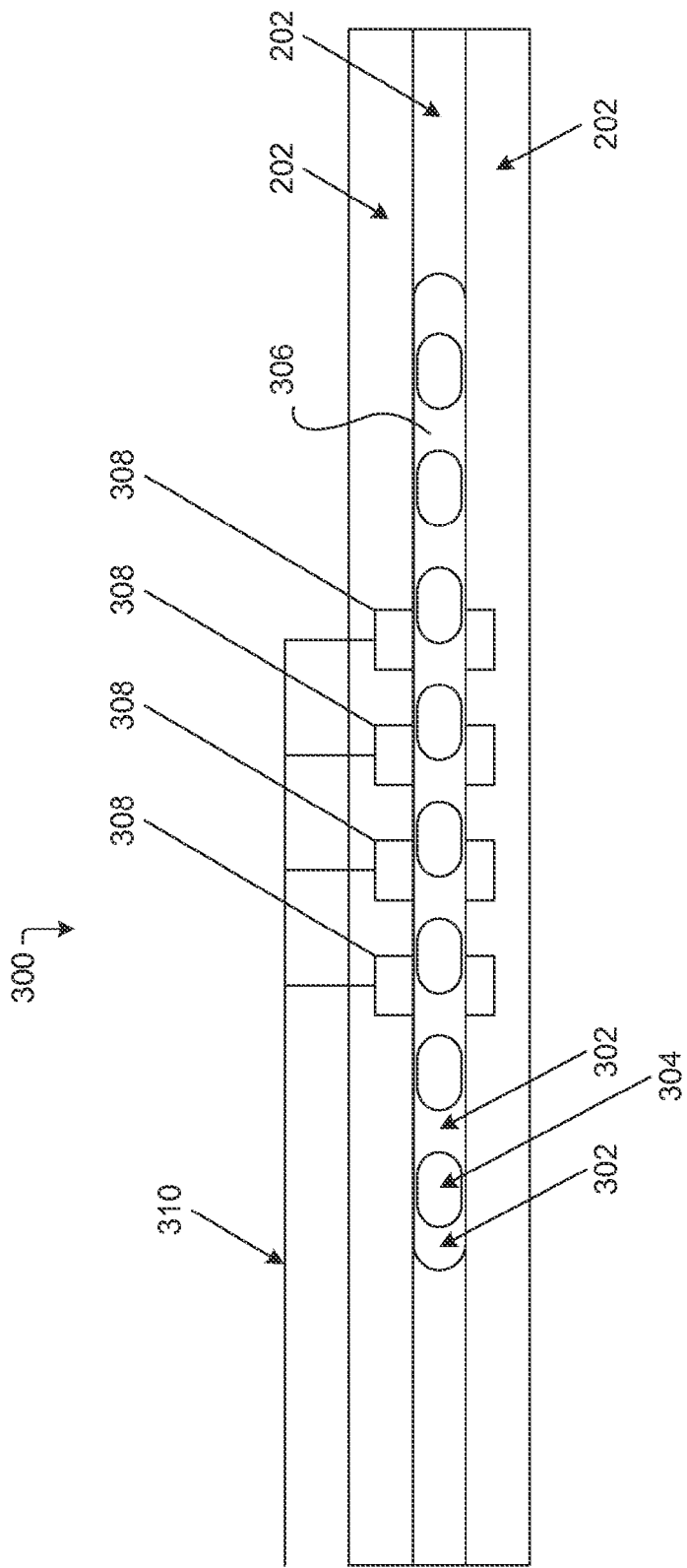
FIG. 4 is a cross sectional view from the top of the core of the exemplary ski of FIG. 1 consistent with the technology of the present application.

As can be appreciated, with reference back to FIG. 1, the length $L_1$, $L_2$ of the ski 100 and the snowboard 200 is larger than the width $W_1$, $W_2$. The construction along with the dimensions of the ski 100 and the snowboard 200 provides good flexibility for the ski and the snowboard. Both the ski and snowboard as they travel over terrain vibrate, sometime generically referred to as chatter, and flex. The up and down motion caused by the vibrations (or flex) may be used as a pumping action for a microfluidic device provided in the body of the ski 100 or the snowboard 200, for example, in the core 202. Referring now to FIGS. 3 and 4, cross-sectional views of the core 202 are provided with FIG. 3 being a side view and FIG. 4 being a top view. The structure used as the means to generate electrical charge or energy may include a microfluidic device. One possible microfluidic device 300, as shown in FIGS. 3 and 4, is disclosed in U.S. Pat. No. 7,898,096, which issued Mar. 1, 2011, and which is incorporated herein by reference as if set out in full. As shown in FIGS. 3 and 4, core 202 is formed with a channel 306 or space. The core 202 should be formed of a dielectric or non-conductive material. A plurality of electrodes 308 are arranged about the channel 306. Leads 310 complete the electrical circuit to an interface 312, such as, for example, a plug, or the like. The microfluidic device may directly power heaters in a boot for example, or supply power view leads to portable electronic devices (not specifically shown). The interface 312 may provide for directly powering a device or may provide a continuous charge to prolong the life of batteries associated with the device. For example, electric boot heaters may be provided with a battery to heat resistors or the like in the boot. The interface 312 would allow for plugging the battery to the microfluidic device such that a charge was supplied to the battery to prolong the life thereof.

With further reference to FIGS. 3 and 4, the microfluidic device includes a movable fluidic body 303 disposed in channel 306 and configured to slide along channel 306 past electrodes 308. Fluidic body 303 consists of two immiscible liquids, one being a dielectric liquid and the other one being an electrically conductive liquid. Examples of suitable electrically conductive liquids include aqueous salt solutions and molten salts. Exemplary aqueous salt solutions include 0.01 molar solutions of salts such as $CuSO_4$, LiCl, $KNO_3$, or NaCl. Exemplary molten salts include 1-ethyl-3-methylimidazolium tetrafluoroborate and 1-ethyl-3-methylimidazolium trifluoromethanesulfonate, which are both commercially available. In other cases, the conductive liquid can comprise liquid metals such as gallium, indium or mercury. Examples of suitable dielectric liquids include silicone oils and alkanes. Exemplary silicone oils include polydimethylsiloxane and polydiphenylsiloxane, and exemplary alkanes include nonane and heaxadecane.

Conductive and dielectric liquids are spatially separated in a plurality of distinct regions. Dielectric liquid regions 302 and conductive liquid regions 304 are arranged in a periodic alternating pattern, such that conductive and dielectric regions regularly alternate. The boundaries between immiscible liquid regions are preserved by the surface tension forces, giving fluidic body 303 an ability to move as a whole, e.g. slide along channel 306 without disturbing the arrangement and volume of the above-mentioned distinct liquid regions.

The pumping action to move the fluidic body 303 may be provided by vibration of the ski or snowboard as explained above. As the fluidic body 303 moves past the electrodes 308, the mechanical energy is converted into electrical energy to power or charge the electronic device.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A flexible ski or board adapted to travel over a surface, the ski or board comprising:
   a flexible composite structure having a first side and a second side opposite the first side, at least a portion of the flexible composite structure being formed from a non-conductive material;
   at least one channel residing between the first side and the second side and about the non-conductive material;
   at least two electrodes arranged on the at least one channel;
   an interface, wherein the interface is electrically coupled to the at least two electrodes, wherein the at least one channel comprises:
   a fluid contained in the at least one channel, the fluid comprising:
     a dielectric fluid; and
     a conductive fluid, wherein the dielectric fluid and conductive fluid are alternatingly arranged in the at least one channel,
   wherein the flexible material is configured to flex and provide a motive force to oscillate the fluid in the at least one channel such that the dielectric fluid and conductive fluid move past the at least two electrodes and generate an electric charge.

2. The ski or board of claim 1 wherein the ski or board comprises at least one of snow-ski or a snowboard.

3. The ski or board of claim 1 wherein the ski or board comprises at least one of a jet-ski, snowmobile ski, or a skateboard.

4. The ski or board of claim 1 wherein the plurality of electrodes are coupled to a battery.

5. The ski or board of claim 2 wherein the plurality of electrodes are coupled to an interface that is configured to provide electrical power to a ski or snowboard boot.

6. The ski or board of claim 1 wherein the plurality of electrodes are coupled to a plug.

7. The ski or board of claim 1 wherein the dielectric fluid comprises a first plurality of regions in the at least one channel and wherein the conductive fluid comprises a second plurality of regions in the at least one channel and wherein the first plurality of regions are spaced apart by the second plurality of regions over a length of the at least one channel.

8. A method of generating electrical power in a ski or board, comprising:
 providing a flexible ski or board adapted to travel over a surface, the ski or board comprising:
  a flexible composite structure having a first side and a second side opposite the first side, at least a portion of the flexible composite structure being formed from a non-conductive material;
  at least one channel residing between the first side and the second side and about the non-conductive material;
  at least two electrodes arranged on the at least one channel;
  an interface, wherein the interface is electrically coupled to the at least two electrodes, wherein the at least one channel comprises:
  a fluid contained in the at least one channel, the fluid comprising:
   a dielectric fluid; and
   a conductive fluid, wherein the dielectric fluid and conductive fluid are alternatingly arranged in the at least one channel,
  wherein the flexible material is configured to flex and provide a motive force to oscillate the fluid in the at least one channel such that the dielectric fluid and conductive fluid move past the at least two electrodes and generate an electric charge;
 causing the ski or board to travel over the surface;
 oscillating the fluid in the channel such that the fluid moves past the at least two electrodes;
 generating the electric charge; and
 supplying the electric charge to the interface.

9. The method of claim 8 further comprising plugging a heater into the interface.

10. The method of claim 8 further comprising plugging a portable electronic device into the interface.

11. The apparatus of claim 8 wherein the step of causing the ski or board to travel over the surface comprises causing the ski or board to move in an up and down motion and where the up and down motion pumps the fluid to cause oscillating movement.

12. The apparatus of claim 8 wherein the implantable device is an electrical stimulation generator.

13. An apparatus comprising:
 a flexible, elongate member configured for movement over a body, the flexible, elongate member comprising
  a top surface;
  a bottom surface opposite the top surface, wherein the bottom surface is configured to directly contact and travel over the body; and
  at least one non-conductive core material residing between the top surface and the bottom surface;
 means for generating electrical power in the core when the flexible, elongate surface moves over the body; and
 an interface operatively coupled to the means for generating electrical power,
 wherein the flexible, elongate member is configured to flex and provide a motive force to oscillate the fluid in the at least one channel such that the dielectric fluid and conductive fluid move past the at least two electrodes and generate an electric charge.

14. The apparatus of claim 13 wherein the means for generating electrical power comprises:
 at least one channel residing non-conductive core material;
 at least two electrodes arranged on the at least one channel;
 a fluid contained in the at least one channel, the fluid comprising:
  a dielectric fluid; and
  a conductive fluid, wherein the dielectric fluid and conductive fluid are alternatingly arranged in the at least one channel.

15. The apparatus of claim 13 wherein the means for generating an electrical charge comprises a reverse electrowetting device.

16. The apparatus of claim 13 wherein the flexible, elongate member comprises a ski.

17. The apparatus of claim 13 wherein the flexible, elongate member comprises a snowboard.

* * * * *